G. M. EATON.
LOCOMOTIVE.
APPLICATION FILED JAN. 16, 1917.

1,347,898.

Patented July 27, 1920.
2 SHEETS—SHEET 1.

WITNESSES:
Fred. A. Lind.
W. B. Wells

INVENTOR
George M. Eaton
BY
Wesley G. Carr
ATTORNEY

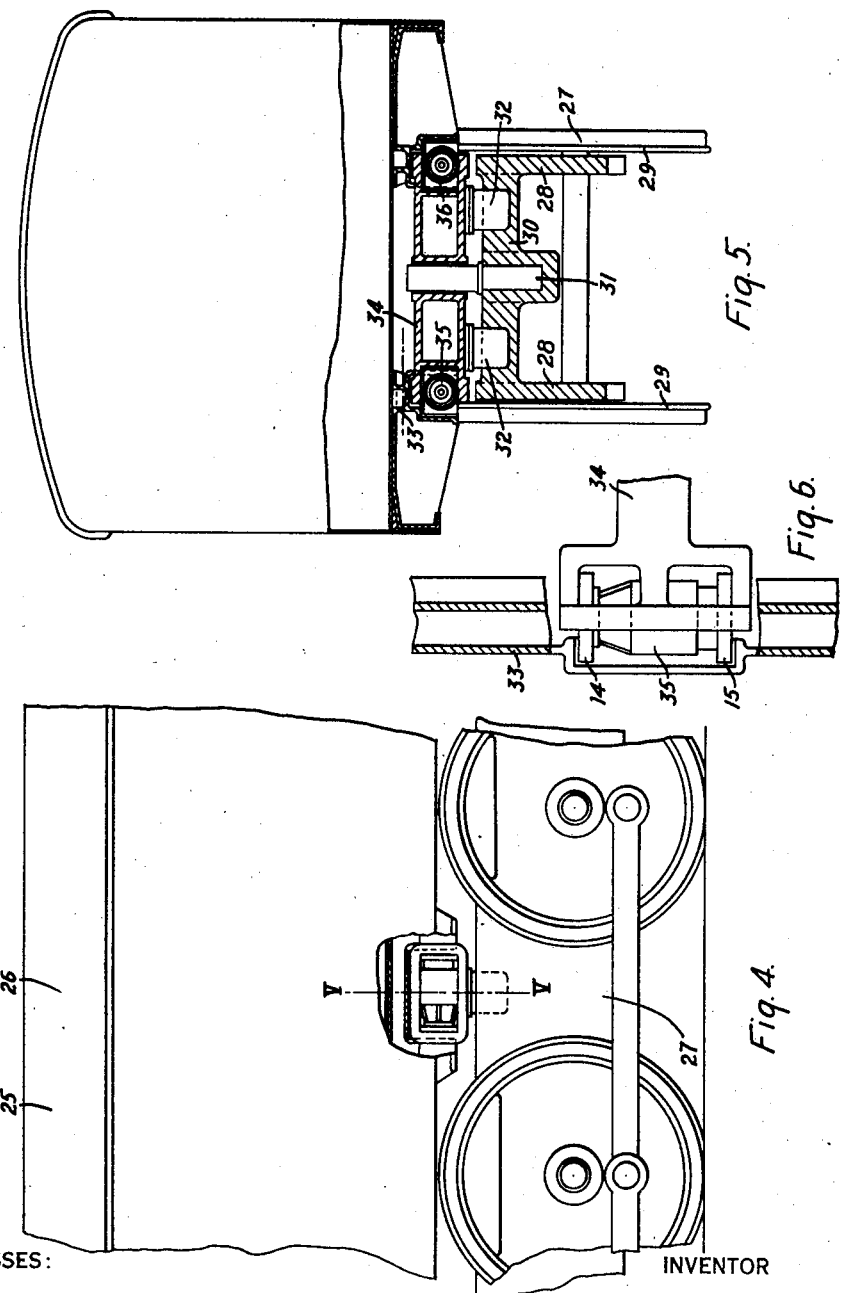

UNITED STATES PATENT OFFICE.

GEORGE M. EATON, OF PITTSBURGH, PENNSYLVANIA, ASSIGNOR TO WESTINGHOUSE ELECTRIC AND MANUFACTURING COMPANY, A CORPORATION OF PENNSYLVANIA.

LOCOMOTIVE.

1,347,898.   Specification of Letters Patent.   Patented July 27, 1920.

Application filed January 16, 1917. Serial No. 142,634.

*To all whom it may concern:*

Be it known that I, GEORGE M. EATON, a citizen of the United States, and a resident of Pittsburgh, in the county of Allegheny and State of Pennsylvania, have invented a new and useful Improvement in Locomotives, of which the following is a specification.

My invention relates to locomotives and particularly to means for joining the trucks to the cabs thereof.

One object of my invention is to provide a locomotive having a truck and a cab with means which shall cushion all longitudinal forces that act between the truck and the cab and maintain a force which tends to hold the truck parallel to the cab.

Another object of my invention is to provide a locomotive of the above-indicated character which shall have the trucks thereof pivotally joined to the cab and cushion the trucks relative to the cab in a longitudinal direction.

More specifically, my invention embodies a locomotive provided with friction-draft gears which shall resiliently connect the trucks to the cab and exert a force to maintain the trucks parallel to the cab and thus prevent nosing of the trucks.

At the present time, trouble is experienced with electric locomotives in breaking an excessive number of the center pins which join the trucks to the cab. The inertia of the cab, when the locomotive bumps a train or when heavy surges occur when running, causes the cab to strike the center pins a solid blow which, in many cases, breaks one of the same. As the tendency in locomotive construction is to build larger cabs than the ones now in service, it is necessary to provide some means for relieving the various center pins of the sudden blows which they are subjected to by reason of the inertia of the cab.

According to my invention, friction-draft gears are provided for joining the trucks to the cab to cushion the center pins against all longitudinal forces acting between the trucks and the cab.

Figure 3:
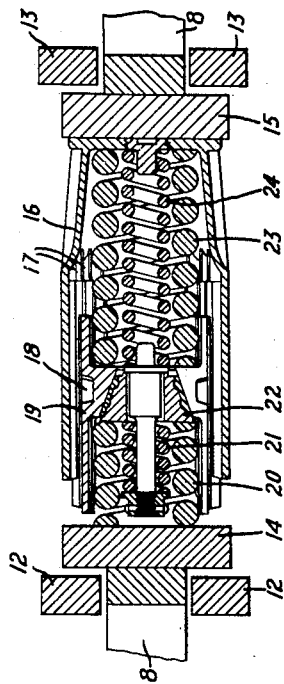
Figure 2:
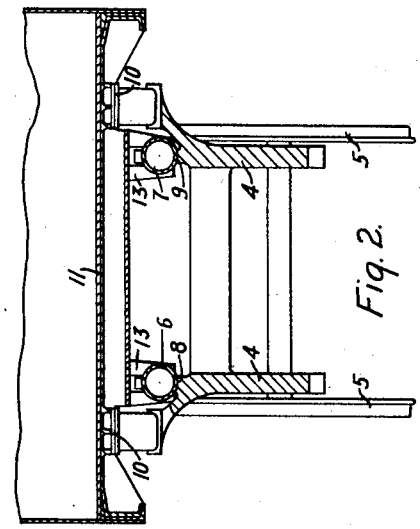
Figure 1:
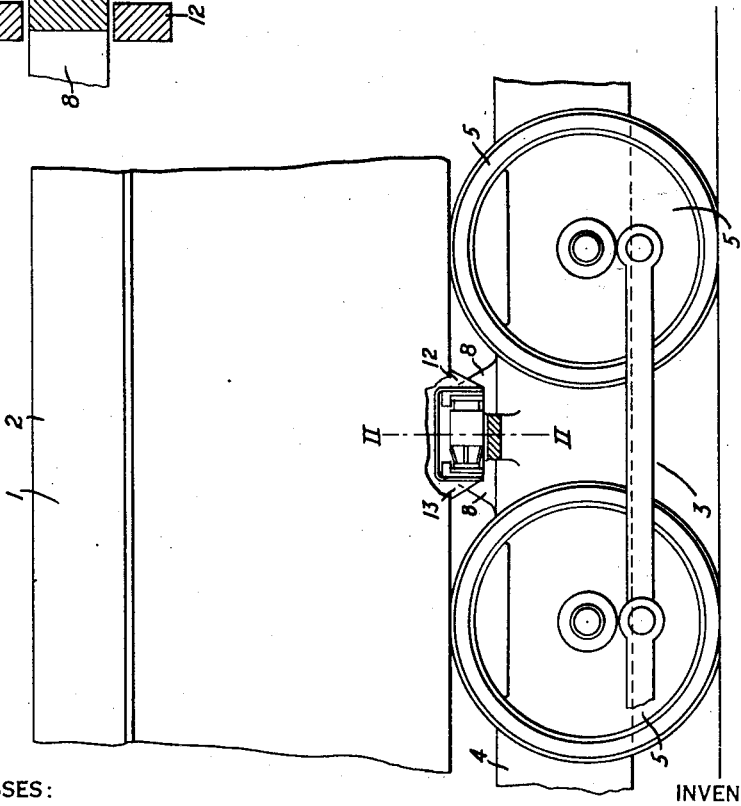

In the accompanying drawings, Figure 1 is a partial side elevational view of a locomotive constructed in accordance with my invention; Fig. 2 is a sectional end view of the locomotive illustrated in Fig. 1; Fig. 3 is a sectional view of a standard friction-draft gear; Fig. 4 is a partial side elevational view of a locomotive embodying a modification of my invention; and Figs. 5 and 6 are sectional views of the locomotive illustrated in Fig. 4.

Referring to Figs. 1, 2 and 3 of the drawings, a locomotive 1 embodies a cab or vehicle body 2 and a truck 3. The truck 3 is provided with side frames 4 which are mounted on the driving wheels 5 and with friction-draft gears 6 and 7 which are supported on the side frames 4 by means of the pedestal jaws 8 and 9.

The cab 2 is supported on the side frames 4 by means of friction bearings 10 and is provided with a cross beam 11 having projections or jaws 12 and 13 extending downwardly therefrom. The projections or jaws 12 and 13 of the cross beam 11 are disposed adjacent or opposed to the pedestal jaws 8 and 9, as illustrated in Fig. 3 of the drawings, and in a position to engage the follower plates 14 and 15 of the friction-draft gears 6 and 7.

Referring to Fig. 3 of the drawings, each friction-draft gear embodies a cylindrical body portion 16 which is open at one end and is provided with grooves 17 which are adapted to receive friction strips 18 and segmental carriers 19. A preliminary spring 20 and an auxiliary preliminary spring 21 are disposed between the forward follower plate 14 and a center wedge 22 which has the shape of a frustum of an octagonal pyramid and is in contact with the segmental carriers 19. A release spring 23 and an auxiliary release spring 24 are disposed between the segmental carriers 19 and the closed end portion of the body portion 16.

The above friction-draft gear is the well-known Westinghouse friction-draft gear which is adapted to cushion the forces acting in a longitudinal direction thereof and dissipate the same by friction. Thus, if we consider the pedestal jaws 8 in Fig. 3 to remain stationary and the projections 12 and 13 to be suddenly moved relative thereto so that the projections 12 engage the follower plate 14, the blow is first cushioned by means of the preliminary spring 20 and the auxiliary preliminary spring 21. Then, the segmental carriers 19 and the friction strips 18 frictionally engage the body portion 16 and are moved forward with the wedge 22 until the friction between the cylinder 16 and the parts 18 and 19 is equivalent to a force applied to the follower plate 14 by the projections 12. When the follower plate 14 is relieved of the pressure thereon, the release springs 23 and 24 return the various parts of the friction-draft gear to normal position. As the above friction-draft gear is of a standard well-known type, it is deemed unnecessary to give a further description thereof. The particular type of friction-draft gear illustrated is not essential to my invention and any other well-known friction-draft gear may be utilized, if so desired.

From the above description of the friction-draft gear, it is believed that the function of the same in connecting the truck 3 to the cab 2 will be readily perceived. Thus, in case the truck 3 is suddenly moved to the left relative to the cab 2, the pedestal jaws 8 and 9 engage the follower plates 14 of the friction-draft gears 6 and 7 which cushion the blow delivered by the truck 3 before the same is transmitted to the projections 13 from the cab 2. In case the truck is moved in the opposite direction, the friction-draft gears 6 and 7 will again perform a like function and cushion the blow from the truck 3 before the same is delivered to the projections 13 from the cab 2.

Sufficient clearance should be provided between the projections 12 and 13 of the cross beam 11 and the pedestal jaws 8 and 9 in order that the locomotive may safely negotiate any curve in the track which it may encounter. If desired, friction shoes (not shown) may be installed in all contact-making surfaces between the projections 12 and 13 and the pedestal jaws 8 and 9.

Referring to Figs. 4, 5 and 6 of the drawings, a locomotive 25 embodies a cab 26 and a truck 27 which is pivotally and resiliently connected to the cab 26. The truck 27 embodies side frames 28 which are mounted on driving wheels 29 and a truck bolster 30 which is adapted to support a center pin 31 and friction bearings 32. The cab 26 is provided with a frame structure 33, a cross beam 34 and friction-draft gears 35 and 36 for frictionally and resiliently connecting the cross beam to the frame 33 of the cab.

The friction-draft gears 35 and 36 which are illustrated in Figs. 4, 5 and 6 are similar to the friction-draft gears illustrated in Fig. 3, and corresponding reference characters are used in describing the same. The end portions of the cross beam 34 are constructed for supporting the friction-draft gears 35 and 36, as illustrated in Fig. 6, so that the follower plates 14 and 15 may engage the cab frame 33 whenever the truck 27 and the cross beam 34 are moved relative to the cab 26. Thus, in case the truck 27 is moved suddenly toward the right, as illustrated in Fig. 4 of the drawings, the cross beam 34, which is directly connected to the truck 27 by means of the center pin 31, will force the follower plates 15 of the friction-draft gears 35 and 36 into engagement with the cab frame 33. However, the force of the blow is cushioned by means of the preliminary springs contained in the friction-draft gears 35 and 36. Thus, it is perceived that the center pin 31 is insured against all blows which may be caused by reason of the inertia of the cab.

In case the wheel-base arrangement and the curves in the track to be traversed require compression of the draft gear springs beyond the limit of the springs in a standard friction-draft gear, it may be necessary to install special springs having a greater travel before the friction surfaces engage. Special springs may also be necessary to provide comparatively free swing of the truck within the necessary operative limits and to avoid excessive frictional restraint when the locomotive is running on a curved track.

Various modifications in the structure herein set forth may be made within the spirit and scope of my invention, and I desire that only such limitations shall be imposed as are indicated by the appended claims.

I claim as my invention:

1. In a vehicle, the combination with a truck, of a vehicle body mounted thereon, a fixed pin pivotally connecting said truck and body, and means for cushioning relative longitudinal movements of the truck and body to reduce the breaking strains on said fixed pin, said means also tending to maintain said truck and body parallel to one another.

2. In a vehicle, the combination with a truck, of a vehicle body mounted thereon, independent pairs of opposed jaws on opposite sides of the longitudinal center line of said vehicle, and resilient means in the spaces between said jaws for cushioning relative longitudinal movements of said body and truck.

3. In a vehicle, the combination with a truck, of a vehicle body mounted thereon, a fixed center pin pivotally connecting said truck and body, independent pairs of opposed jaws on opposite sides of the longitudinal center line of said vehicle, and resilient means in the spaces between said jaws for cushioning relative longitudinal movements of said body and truck to reduce the breaking strains on said fixed center pin, said means also tending to maintain said body and truck parallel to one another.

4. In a vehicle, the combination with a truck and a cab, of friction-draft gears disposed between the cab and the truck for cushioning longitudinal forces acting between the cab and the truck and for tending to maintain the truck in a position parallel to the cab.

5. In a vehicle, the combination with a truck and a vehicle body, of a friction-draft gear, and projecting jaws respectively mounted on said truck and said body for engaging the friction-draft gear to effect a resilient connection between the body and the truck.

6. In a vehicle, the combination with a truck and a cab, of means for resiliently and frictionally joining the truck to the cab to cushion longitudinal forces acting between the cab and the truck.

7. In a vehicle, the combinaiton with a truck, of a vehicle body mounted thereon, a beam carried by, and extending transversely of, one of said members, pairs of jaws on said beam, pairs of jaws on the other member opposed to the jaws on the beam, and resilient means in the spaces between said jaws for cushioning relative longitudinal movements of said body and truck.

8. In a vehicle, the combination with a cab and a truck, of a cross beam pivotally connected to the truck, and friction-draft gears mounted on the cross beam for connecting the latter to the cab.

9. In a vehicle, the combination with a truck and a vehicle body, of a cross beam pivotally connected to the truck, and friction-draft gears for connecting said cross beam to the vehicle body.

10. In a vehicle, the combination with a truck and a vehicle body, of a cross beam pivotally connected to the truck and resiliently connected to the vehicle body.

11. In a vehicle, the combination with a truck and a cab, of a cross beam pivotally connected to the truck, and friction-draft gears for resiliently joining the cross beam to the cab.

In testimony whereof, I have hereunto subscribed my name this 30th day of Dec. 1916.

GEORGE M. EATON.